United States Patent
Mukai et al.

(10) Patent No.: US 11,686,019 B2
(45) Date of Patent: Jun. 27, 2023

(54) FIBER CONSTITUTED FROM CARBON NANOTUBE AND METHOD FOR MANUFACTURING SAME

(71) Applicants: National Institute of Advanced Industrial Science and Technology, Tokyo (JP); Asahi Kasei Kabushiki Kaisha, Tokyo (JP)

(72) Inventors: Ken Mukai, Osaka (JP); Shuhei Ikenaga, Osaka (JP); Kinji Asaka, Osaka (JP); Toru Morita, Tokyo (JP); Yujin Motoyama, Tokyo (JP); Yuta Saito, Tokyo (JP)

(73) Assignees: National Institute of Advanced Industrial Science and Technology, Tokyo (JP); Asahi Kasei Kabushiki Kaisha, Tokyo (JP)

( * ) Notice: Subject to any disclaimer, the term of this patent is extended or adjusted under 35 U.S.C. 154(b) by 305 days.

(21) Appl. No.: 16/644,656

(22) PCT Filed: Oct. 11, 2018

(86) PCT No.: PCT/JP2018/037978
§ 371 (c)(1),
(2) Date: Mar. 5, 2020

(87) PCT Pub. No.: WO2019/074072
PCT Pub. Date: Apr. 18, 2019

(65) Prior Publication Data
US 2021/0071320 A1 Mar. 11, 2021

(30) Foreign Application Priority Data
Oct. 13, 2017 (JP) .................................. 2017-199838

(51) Int. Cl.
*D01F 9/08* (2006.01)
*D02G 3/44* (2006.01)
(Continued)

(52) U.S. Cl.
CPC .............. *D01F 9/08* (2013.01); *C01B 32/168* (2017.08); *D02G 3/441* (2013.01); *H01B 1/04* (2013.01);
(Continued)

(58) Field of Classification Search
CPC ... D01F 9/08; D01F 9/12; D01F 9/127; C01B 32/168; C01B 32/174; H01B 1/04;
(Continued)

(56) References Cited

U.S. PATENT DOCUMENTS

2009/0075545 A1* 3/2009 Lashmore ............ D04H 1/4242
977/750
2011/0168942 A1 7/2011 Hitoe et al.
(Continued)

FOREIGN PATENT DOCUMENTS

CN 104936895 A 9/2015
EP 2568064 A1 3/2013
(Continued)

OTHER PUBLICATIONS

Mukai "Wet spinning of continuous polymer-free carbon-nanotube fibers with high electrical conductivity and strength" Applied Physics Express 9, 055101 (2016) (Year: 2016).*
(Continued)

*Primary Examiner* — Tri V Nguyen
(74) *Attorney, Agent, or Firm* — Morgan, Lewis & Bockius LLP (57) ABSTRACT

The purpose of the present disclosure is to provide a CNT fiber that is constituted of aligned carbon nanotubes (CNTs), is thin, has little irregularity in thickness, has excellent
(Continued)

winding properties when undergoing coiling processing, and has superior conductivity. Provided is a CNT fiber constituted of carbon nanotubes (CNTs) having a thickness of 0.01 µm-3 mm, having a coefficient of variation for irregularity in thickness of 0.2 or less, having a distribution rate a for deviation from roundness of 40% or greater, and a distribution rate b of 70% or greater. Also provided is a method for manufacturing the CNT fiber.

6 Claims, 2 Drawing Sheets

(51) Int. Cl.
  *H01B 1/04* (2006.01)
  *B82Y 30/00* (2011.01)
  *C01B 32/168* (2017.01)
  *B82Y 40/00* (2011.01)
(52) U.S. Cl.
  CPC .............. *B82Y 30/00* (2013.01); *B82Y 40/00* (2013.01); *C01B 2202/22* (2013.01); *C01B 2202/36* (2013.01); *C01P 2002/82* (2013.01); *C01P 2004/04* (2013.01); *C01P 2006/10* (2013.01); *D10B 2101/122* (2013.01); *D10B 2401/16* (2013.01)
(58) Field of Classification Search
  CPC .......... D02G 3/16; D02G 3/441; B82Y 30/00; B82Y 40/00; C01P 2002/82; C01P 2004/04; C01P 2006/10; D10B 2401/16
  USPC ........................................................ 428/367
  See application file for complete search history.

(56) References Cited

U.S. PATENT DOCUMENTS

| | | | |
|---|---|---|---|
| 2013/0251619 A1 | 9/2013 | Rikihisa et al. | |
| 2014/0346697 A1* | 11/2014 | Rikihisa | D01F 9/12 264/8 |
| 2014/0363669 A1* | 12/2014 | Otto | C09K 5/14 252/502 |
| 2015/0368108 A1 | 12/2015 | Sone | |
| 2016/0083257 A1 | 3/2016 | Mukai et al. | |
| 2019/0048519 A1 | 2/2019 | Onizuka et al. | |

FOREIGN PATENT DOCUMENTS

| | | |
|---|---|---|
| JP | S47-43771 B | 11/1972 |
| JP | S55-122010 A | 9/1980 |
| JP | 2011-502925 A | 1/2011 |
| JP | 2012-127043 A | 7/2012 |
| JP | 2014-502678 A | 2/2014 |
| JP | 2014-530964 A | 11/2014 |
| KR | 10-2016-0131484 A | 11/2016 |
| WO | 2009/054422 A1 | 4/2009 |
| WO | 2009/058855 A2 | 5/2009 |
| WO | 2010/008046 A1 | 1/2010 |
| WO | 2012/070537 A1 | 5/2012 |
| WO | 2012/089179 A1 | 7/2012 |
| WO | 2013/034672 A2 | 3/2013 |
| WO | 2014/185497 A1 | 11/2014 |
| WO | 2017/164206 A1 | 9/2017 |

OTHER PUBLICATIONS

Wu "Relationship between Mechanical and Electrical Properties of Continuous Polymer-Free Carbon Nanotube Fibers by Wet-Spinning Method and Nanotube-Length Estimated by Far-Infrared Spectroscopy." J. Phys. Chem. C 2016, 120, 20419-20427 (Year: 2016).*
Supplementary European Search Report issued in corresponding European Patent Application No. 18865890.0 dated Mar. 4, 2021.
Vigolo et al., "Macroscopic Fibers and Ribbons of Oriented Carbon Nanotubes," Science, 290: 1331-1334 (2000).
Inoue et al., "Anisotropic carbon nanotube papers fabricated from multiwalled carbon nanotube webs," Carbon 49: 2437-2443 (2011).
International Search Report issued in corresponding International Patent Application No. PCT/JP2018/037978 dated Dec. 25, 2018.
International Preliminary Report on Patentability and Written Opinion issued in corresponding International Patent Application No. PCT/JP2018/037978 dated Apr. 14, 2020.

* cited by examiner

FIBER CONSTITUTED FROM CARBON NANOTUBE AND METHOD FOR MANUFACTURING SAME

FIELD

The present invention relates to a carbon nanotube (hereinafter abbreviated as CNT) fiber consisting of aligned CNTs, which is thin, has little thickness irregularity (variation), excellent winding properties during processing, and superior conductivity, as well as a method for manufacturing the CNT fiber.

BACKGROUND

CNTs are a tubular material in which graphene sheets composed of carbon are arranged in a single-layer or multi-layer coaxial tubular state, and are a material which has an ultra-fine diameter, a low weight, high strength, high flexibility, high current density, high thermal conductivity, and high electrical conductivity. CNTs have properties which make it a candidate for next-generation lightweight materials. Though CNTs have mechanical, electrical, and thermal properties that surpass even steel, copper, and diamond, and many applications using CNTs have been envisioned, there are many problems in the processing of CNT raw materials into devices, and as a result, the properties of CNTs cannot be fully utilized. In order to take advantage of the properties of CNTs, as long as a CNT structure in which the CNTs are oriented in a single direction can be formed, for example, CNTs having superior properties can be formed into a filament, CNTs can be used as a substitute material that is thinner, has higher strength, and has higher conductivity than copper wire in electrical wire and coil (motor, inductor) applications. Thus, in order to provide a fiber-like material composed of highly oriented CNTs having unprecedented characteristics, the following manufacturing methods have been proposed.

For example, in Non-Patent Literature 1 below, CNT fiber is produced by injecting a CNT dispersion into a flocculant containing polyvinyl alcohol. However, there is a problem in that the conductivity of the obtained CNT fiber is low.

Furthermore, in Non-Patent Literature 2 below, conductive CNT fibers are produced by withdrawing CNTs from a CNT forest and twisting. However, in this method, it is necessary to use multi-wall carbon nanotubes (MWCNTs), which have a lower conductivity than single-wall carbon nanotubes (SWCNTs) or double-wall carbon nanotubes (DWCNTs), whereby the conductivity is reduced. Furthermore, since a CNT forest is used, there are limits to the production of long CNT fibers.

Furthermore, Patent Literature 1 below discloses a method for manufacturing a high-density CNT fiber by spinning CNTs into liquid crystal state in a super acid solvent such as chlorosulfonic acid. However, in the extrusion of a superacid solution, the hygroscopicity and reactivity of the superacid become problematic. In other words, as described in paragraph [0040] of the description of Patent Literature 1, when the extrusion is interrupted and the CNT fiber is suspended in a gap, water droplets condense on the surface of the fiber before the fiber is introduced into the coagulating liquid, causing recall solidification of the extrudate and the suppression of further elongation, whereby the occurrence of fiber thickness irregularity is inevitable due to cohesion and elongation irregularities (or unevenness). By filling the gap with a dry gas, such a problem might be prevented. However, even in such a case, it is difficult to eliminate thickness irregularity and elongation unevenness due to solidification by the Barus effect. Further, Patent Literature 1 does not describe the roundness of the obtained CNT fiber at all.

Patent Literature 2 below describes a method for producing a CNT aggregation prevention structure wherein a CNT dispersion is formed using a surfactant such as sodium dodecylbenzenesulfonate or sodium dodecyl sulfate, and the dispersion is poured or dropped into a coagulating liquid such as N,N-dimethylacetamide, N-methureacetamide, or ethanol. However, since this method uses an organic solvent filled in a petri dish or the like as a flocculant, and since the strength of the spinning body immediately after injection into the flocculant is weak, and the spun fiber reaches the bottom of the petri dish before coagulation, whereby the obtained CNT fiber becomes flat, and the occurrence of thickness irregularity is inevitable. Further, Patent Literature 2 does not describe the roundness or thickness irregularity of the obtained CNT fiber at all.

Patent Literature 3 below discloses an elongate fiber constituted from SWCNTs having an elongation ratio of 10 to 50%. Examples of the surfactant included in the dispersion include bile salts (e.g., sodium cholate and sodium deoxycholate), and Patent Literature 3 describes in the Examples that sodium cholate (SC) is used, and the conductivity of the CNT fiber obtained by injecting an isopropanol coagulation solution from an injection nozzle having an inner diameter of 0.9 mm is 5707 to 7345 S/cm at an elongation ratio of 12 to 17%. However, like Patent Literature 2, since a petri dish is used, the obtained CNT fiber is flat, and the occurrence of thickness irregularity is inevitable. Furthermore, Patent Literature 3 does not describe the roundness or thickness irregularity of the obtained CNT fiber at all.

CITATION LIST

Patent Literature

[PTL 1] Japanese Unexamined PCT Publication (Kohyo) No. 2011-502925
[PTL 2] Japanese Unexamined Patent Publication (Kokai) No. 2012-127043
[PTL 3] WO 2014/185497

Non-Patent Literature

[NPL 1] Vigolo et. al., Science 290, p. 1331 (2000)
[NPL 2] Inoue et al., Carbon 49, p. 2437 (2011)

SUMMARY

Technical Problem

In light of the above problems of the prior art, an object of the present invention is to provide a fiber consisting of aligned CNTs, which is thin, has little thickness irregularity, high roundness, excellent coiling properties (winding properties) during coil processing, and superior conductivity, and a method for manufacturing the same.

Solution to Problem

In other words, the present invention is as described below.
[1] A carbon nanotube (CNT) fiber consisting of CNTs having a thickness of 0.01 µm to 3 mm, a coefficient of variation for thickness irregularity of 0.2 or less, and a distribution rate a of 40% or more and a distribution rate b of 70% or more as indicators of roundness.

[2] The CNT fiber according to [1], wherein 50 or more CNTs having a diameter of 5 nm or less are present in arbitrary 100 CNTs when observed with a transmission electron microscope.

[3] The CNT fiber according to [1] or [2], wherein in a spectrum obtained by resonance Raman spectroscopic measurement, when the maximum peak intensity in the range of 1550 $cm^{-1}$ to 1650 $cm^{-1}$ is defined as G and the maximum peak intensity in the range from 1300 $cm^{-1}$ to 1400 $cm^{-1}$ is defined as D, the ratio G/D is 0.1 or more.

[4] The CNT fiber according to any one of [1] to [3], having a fiber density of 0.3 $g/cm^3$ to 2.0 $g/cm^3$.

[5] The CNT fiber according to any one of [1] to [4], having a conductivity of 3000 S/cm to 60000 S/cm.

[6] An electrical wire comprising the CNT fiber according to any one of [1] to [5].

[7] A coil comprising the CNT fiber according to any one of [1] to [5].

[8] A method for manufacturing a carbon nanotube (CNT) fiber having a thickness of 0.01 μm to 3 mm, a thickness irregularity of 0.2 or less in coefficient of variation, and a distribution rate a of 40% or more and a distribution rate b of 70% or more as indicators of roundness, the method comprising:

a spinning step wherein an aqueous dispersion including CNTs and a surfactant is discharged into a coagulation bath including an organic solvent to obtain CNT aggregate structures in the form of threads, and a step wherein the obtained CNT aggregate structures are continuously drawn from the coagulation bath at a linear velocity equal to or greater than a linear discharge velocity.

Advantageous Effects of Invention

The fiber consisting of CNTs (hereinafter referred to simply as CNT fiber) according to the present invention has a thickness of 0.01 μm to 3 mm, a coefficient of variation for thickness irregularity of 0.2 or less, and a distribution rate a of 40% or more and a distribution rate b of 70% or more as indicators of roundness, i.e., is a fiber constituted from aligned CNTs, which is thin, has little thickness irregularity, high roundness, excellent coiling properties (winding properties) during coil processing, and superior conductivity, and thus is suitable for applications such as coils (motors and inductors) and electrical wires. Since the conductivity and the current density depend on the smallest cross-sectional area of the single fiber, if the thickness irregularity is small, the roundness of the cross-section is high and uniform, whereby the single-fiber conductivity becomes relatively high. Furthermore, the coilability thereof is excellent, and the coil can be wound densely, whereby conductive sites present in the coil become relatively frequent.

DESCRIPTION OF EMBODIMENTS

The embodiments of the present invention will be described in detail below.

The carbon nanotube (CNT) fiber of the present embodiment is a fiber consisting of CNTs having a thickness of 0.01 μm to 3 mm, a coefficient of variation for thickness irregularity of 0.2 or less, and a distribution rate a of 40% or more and a distribution rate b of 70% or more as indicators of roundness.

In the present description, the phrase "consisting of" or "constituted from" is not intended to exclude the inclusion of other components as long as the desired properties of the present embodiment are exhibited.

CNTs are a carbon-based material composed of graphene sheets wound into a tube-like shape. Various types of CNTs are known, such as, for example, single-wall carbon nanotubes (SWCNTs), double-wall carbon nanotubes (DWCNTs), and multi-wall carbon nanotubes (MWCNTs) having three or more walls, which are roughly divided based on the number of the surrounding wall configuration. Furthermore, graphene sheets are classified into chiral (spiral), zig-zag, and armchair types, depending on the structure of the graphene sheet.

The thickness of the fiber consisting of CNTs of the present embodiment is 0.01 μm to 3 mm, preferably 1 μm to 100 μm, and more preferably 10 μm to 50 μm.

As long as the thickness is 0.01 μm to 3 mm, the yield of CNT fiber in the spinning process is improved. It should be noted that thickness is determined from an average value, as is described later. In the present description, the term "to" in ranges is inclusive, such as, for example 0.01 μm or more and 3 mm or less.

Furthermore, the coefficient of variation for thickness irregularity of the fiber consisting of CNTs of the present embodiment is 0.2 or less, preferably 0.15 or less, and more preferably 0.07 or less.

As long as the coefficient of variation for thickness irregularity is 0.2 or less, the arrangement state of the CNTs in a single CNT fiber is excellent, the minimum cross-sectional area in a single CNT fiber is relatively large, and the conductivity, which depends on the cross-sectional area, is high.

As the method for calculating the coefficient of variation serving as an indicator of thickness irregularity, the widths in X-axis and Y-axis directions are measured using a non-contact laser with a high-precision dimension measuring device or contact-type device in two axes, wherein the X-axis and Y-axis directions are X-axis and Y-axis cross-sections perpendicular to the X-axis in the cross-sectional direction of the CNT fiber. As another method of measuring the width, image data obtained from an optical microscope or an electron microscope image can be used and the width can be calculated by image analysis software. Width can also be calculated using a contact-type device such as a macrometer or calipers. The total number of measurements points is in a range of 100 or more, and the average value of the numerical values in the X-axis and Y-axis directions is defined as the thickness.

Furthermore, the average value is set as the average diameter of the CNT fiber, and the cross-sectional area is calculated.

Regarding thickness irregularity, the numerical values on the X-axis and the Y-axis, and the average value of all of the values are measured, and after calculating the standard deviation, the value obtained by dividing the standard deviation of the thickness by the average value of the thickness is set as the coefficient of variation, which is a parameter of the thickness irregularity.

As indicators of roundness of the fiber consisting of CNTs of the present embodiment, the distribution rate a is 40% or more and the distribution rate b is 70% or more, preferably the distribution rate a is 50% or more and the distribution rate b is 80% or more, more preferably the distribution rate a is 55% or more and the distribution rate b is 85% or more, and further preferably the distribution rate a is 60% or more and the distribution rate b is 90% or more.

As long as the distribution rate a is 40% or more and the distribution rate b is 70% or more, conductivity increases and coilability is excellent, and since the coil can be wound densely, conductive sites present in the coil become relatively frequent.

As the method for calculating roundness, roundness is evaluated by the values of the distribution rate a (%) and the distribution rate b (%) by determining X/Y with respect to the X-axis direction and Y-axis direction widths measured in the thickness irregularity calculation, and setting the presence rate of $0.9 \leq X/Y \leq 1.1$ as the distribution rate a (%) and the presence rate of $0.8 \leq X/Y \leq 1.2$ as the distribution rate b (%) among all measurement points.

The length of the fiber consisting of CNTs of the present embodiment is preferably 0.5 m or more, more preferably 1 m or more, and further preferably 5 m or more. As long as the fiber length is 0.5 m or more, the number of winding options increases in applications such as coils.

Note that there are no problems if the fiber contains more than 50% by mass of CNTs, since the substantial effect of the present embodiment is exhibited thereby. However, it is preferable that more than 80% by mass of CNTs be contained, it is more preferable that more than 90% by mass of CNTs be contained, it is further preferable that more than 95% by mass of CNTs be contained, and it is most preferable that more than 98% by mass of CNTs be contained.

Figure 2:
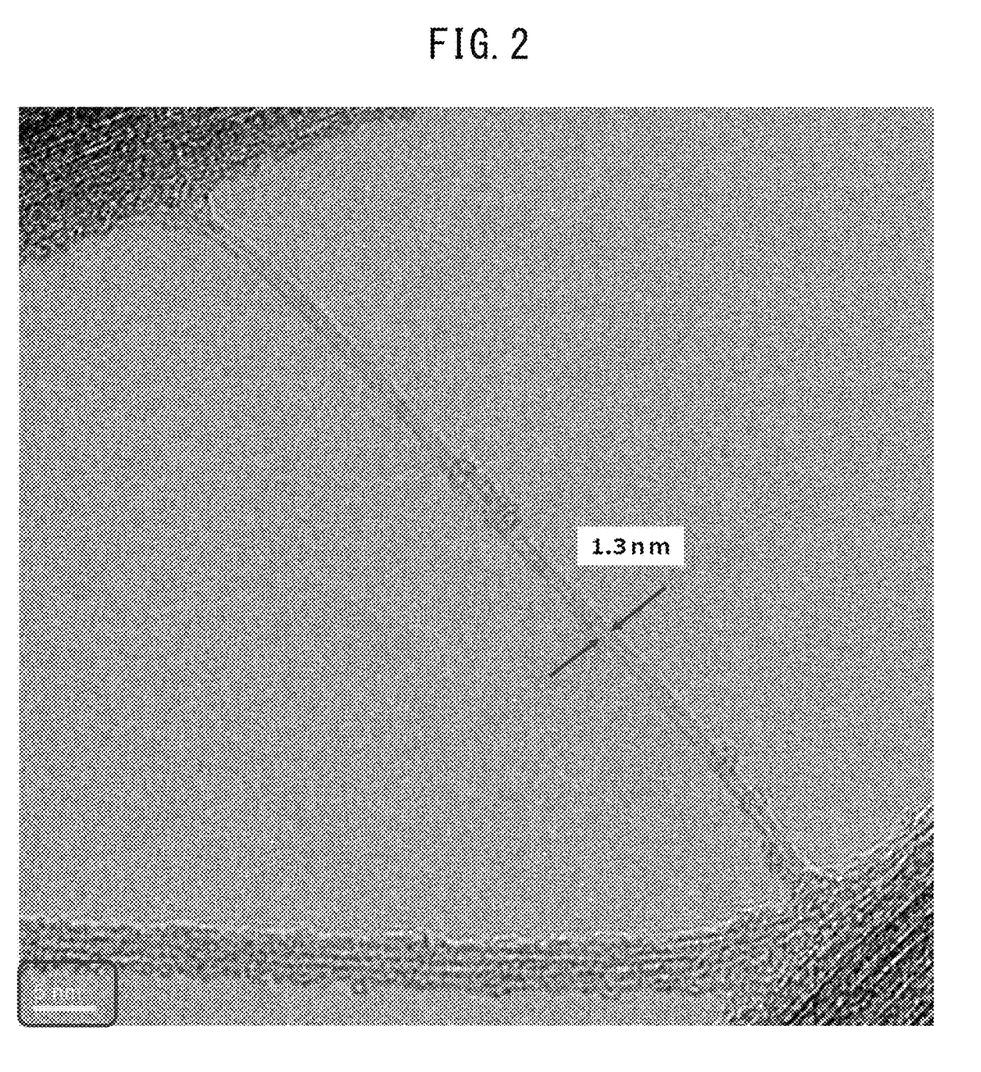
FIG. 2 is a high-resolution transmission electron microscope photograph (320,000 times) of the CNT fiber obtained in Example 3.

In the present embodiment, as long as a so-called "CNT" is used, any type of CNTs may be used, through generally, the use of high-conductivity single-wall carbon nanotubes (SWCNTs) or double-wall carbon nanotubes (DWCNTs) as a raw material is preferable since a high-conductivity CNT can be obtained therewith. Though multi-wall carbon nanotubes (MWCNTs) having three or more walls may be included, it is preferable that the ratio of SWCNTs and/or DWCNTs be high. Since the diameters of SWCNTs and DWCNTs are generally 5 nm or less, it is preferable that 50 or more CNTs having a diameter of 5 nm or less be present when observation in which the diameter of a single CNT can be measured by image analysis with a transmission electron microscope at a magnification of 200000 to 1000000 times is performed, 100 locations where the CNT bundle is unraveled and a single CNT is present in the field of view are selected, and the diameters of 100 selected CNTs are evaluated using image analysis software, as shown in FIG. 2. At this time, a single CNT is counted as one CNT if the CNT is present in single-strand state within the field of view, though both ends need not necessarily be visible. Furthermore, if there are two strands in the field of view, they may be connected outside the field of view and become a single strand. However, even in this case, such strands are counted as two. Out of arbitrary 100 CNTs, the number of CNTs having a diameter of 5 nm or less is more preferably 70 or more, further preferably 90 or more, and most preferably 100.

The G/D of the fiber consisting of CNTs of the present embodiment is preferably 0.1 or more, more preferably 1 or more, and further preferably 2 or more. In other words, in the spectrum obtained by resonance Raman spectroscopic measurement, when the maximum peak intensity within the range of 1550 to 1650 $cm^{-1}$ is set as G and the maximum peak intensity within the range of 1300 to 1400 $cm^{-1}$ is set as D, the ratio G/D is preferably 0.1 or more.

The peak within the range of 1550 to 1650 $cm^{-1}$ is referred to as the G band, which is the peak derived from the graphite structure of the CNTs, and the peak within the range of 1300 to 1400 $cm^{-1}$ is referred to as the D band, which is the peak derived from lattice defects in amorphous carbon and the carbon nanotubes. The relative occurrence rate of defect sites in the CNT can be quantified using the G/D ratio. A G/D ratio of 1 or more means that the CNTs are composed of high-quality carbon nanotubes with few lattice defects, and in particular, as long as the G/D ratio is 2 or more, more preferably 20 or more, especially 30 or more, the CNT fiber will be composed of a higher-quality CNTs and will be excellent in thermal conductivity, electrical conductivity, and heat resistance.

The density of the fiber consisting of CNTs of the present embodiment is preferably 0.3 $g/cm^3$ or more, more preferably 0.5 $g/cm^3$ or more, and further preferably 0.8 $g/cm^3$ or more. As long as the fiber density is 0.3 $g/cm^3$ or more, the voids in the CNT fiber decrease, the number of conductive paths increases, and the inter-bonding in the CNTs becomes strong, resulting in excellent strength and conductivity.

The conductivity (electrical conductivity) of the fiber consisting of CNTs of the present embodiment is preferably 3000 S/cm to 60000 S/cm, more preferably 8000 S/cm to 60000 S/cm, and further preferably 15000 S/cm to 60000 S/cm.

As long as the conductivity is 3000 S/cm or more, the CNT fiber is suitable for application such as electrical wires and coils (motors, inductors).

The Young's modulus of the fiber consisting of CNTs of the present embodiment is preferably 0.5 GPa to 1000 GPa, more preferably 2 GPa to 1000 GPa, and further preferably 5 GPa to 1000 GPa.

The breaking strength of the fiber consisting of CNTs of the present embodiment is preferably 50 MPa to 3000 MPa, more preferably 500 MPa to 3000 MPa, and further preferably 1000 MPa to 3000 MPa.

Each physical characteristic value can be measured by a method known to those skilled in the art. For example, Young's modulus and breaking strength can be measured in accordance with JIS L1013. Specifically, stress-strain measurement is performed, and the Young's modulus is obtained from the initial slope of the curve, and breaking strength is obtained from the stress at the breaking position. Conductivity is obtained from the slope obtained by performing current-voltage measurement by the four-terminal method.

The method for manufacturing the CNTs is not particularly limited, and examples thereof include the super-growth CVD method, direct injective pyrolytic synthesis (DIPS), and enhanced direct injective pyrolytic synthesis (eDIPS). The CNT of the present embodiment may be either carbon nanotubes manufactured by the super-growth CVD method (SG-CNTs) or carbon nanotubes manufactured by enhanced direct injective pyrolytic synthesis (eDIPS-CNTs), through from the point of view of conductivity, eDIPS-CNTs are preferable.

SG-CNTs are described in, for example, K. Hata et al., Science 306, p. 1362 (2004), and eDIPS-CNT is described in, for example, T. Saito et al., J. Nanosci. Nanotechnol., 8, p. 6153 (2008).

The present inventors have discovered that by reducing the cross-sectional area of the fiber consisting of CNTs, minimizing defects in the CNTs constituted of the obtained fibers, and maximizing the effective length of the CNTs, the mechanical properties and conductivity of the fiber consisting of CNTs are improved.

The fiber consisting of CNTs of the present embodiment can be produced by, for example, a method for the production of a carbon nanotube (CNT) fiber having a thickness of 0.01 µm to 3 mm, a thickness irregularity of 0.2 or less in coefficient of variation, and a distribution rate a of 40% or more and a distribution rate b of 70% or more as indicators of roundness, the method comprising:

a spinning step wherein an aqueous dispersion including CNTs and a surfactant is discharged into a coagulation bath including an organic solvent to obtain CNT aggregate structures in the form of threads, and a step wherein the obtained CNT aggregate structures are continuously drawn from the coagulation bath at a linear velocity equal to or greater than a linear discharge velocity. Such a manufacturing method may further include a step of elongation of the continuously pulled fiber before drying while swelling with water, an organic solvent, or the like, and a step of drying.

First, the CNTs are dispersed in an aqueous solution containing a surfactant. A nonionic surfactant, anionic surfactant, cationic surfactant, or amphoteric surfactant may be used as the surfactant.

Examples of nonionic surfactants include polyoxyethylene alkyl ether, polyoxyethylene alkyl phenyl ether, sorbitan fatty acid ester, sucrose fatty acid ester, polyoxyethylene sorbitan fatty acid ester, polyoxyethylene sorbitol fatty acid ester, glycerin fatty acid ester, polyoxyethylene fatty acid ester, and polyoxyethylene polyoxypropylene block copolymer, and specifically, poly(oxyethylene)octylphenyl ether (e.g., Triton™ X-100) and polyoxyethylene sorbitan monolaurate (e.g., Tween™ 20).

Examples of anionic surfactants include alkyl benzene sulfonates (e.g., sodium dodecyl benzene sulfonate), alkyl alcohol sulfates (e.g., sodium dodecyl sulfate.), sodium alkyl diphenyl ether disulfonates, sodium polyoxyethylene alkyl ether sulfate, sodium dialkyl sulfosuccinate, sodium alkyl allyl sulfosuccinate, sodium N-lauroyl sarcosine, sodium polyoxyethylene alkylphenyl ether sulfate, sodium(meth) acryloyl polyoxyalkylene sulfate, alkyl alcohol phosphate, and bile salts (e.g., sodium cholate and sodium deoxycholate). Bile salts such as sodium cholate are preferable.

As described above, the present inventors have discovered that by reducing the cross-sectional area of the fiber consisting of CNTs, minimizing defects in the CNTs constituting the fibers, and maximizing the effective length of the CNTs, the mechanical properties and conductivity of the fiber consisting of CNTs are improved, and that in order to obtain a uniform CNT dispersion and CNT fiber while maintaining effective length without generating CNT defects, it is preferable to use sodium taurodeoxycholate as the surfactant.

Examples of cationic surfactants include tetraalkylammonium halide, alkylpyridinium halide, and alkylimidazoline halide.

Examples of amphoteric surfactants include alkyl betaine, alkyl imidazolinium betaine, and lecithin.

The amount of CNTs in the aqueous dispersion containing a surfactant is preferably 0.1% by mass to 10% by mass, and more preferably 0.15% by mass to 8% by mass.

The amount of surfactant in the aqueous dispersion containing CNTs and the surfactant is preferably 0.2% by mass to 20% by mass, and more preferably 0.3% by mass to 16% by mass.

The aqueous dispersion containing CNTs and a surfactant is discharged, in the spinning step, from a syringe or spinneret into a coagulation bath containing an organic solvent to obtain thread-like CNT aggregate structures, and the CNT aggregate structures are continuously drawn from the coagulation bath at a linear velocity equal to or greater than the linear discharge velocity. The diameter of the opening of the syringe or spinneret during discharging is preferably 10 µm to 5000 µm, more preferably 20 µm to 1000 µm. By changing the diameter of the opening within this range, the solidification rate and the diameter of the fiber constituted from CNTs can be adjusted. The aqueous dispersion is discharged in the direction of gravity, immersed in a coagulation bath through the air, and the direction thereof is changed with a changing roller or changing rod, and thereafter the CNT aggregate structures are continuously drawn from the coagulation bath by a rotating roller such as a Nelson type feed roller. At this time, the aqueous dispersion may be discharged directly from the syringe or spinneret into the coagulation bath without passing through the air. Alternatively, the syringe or the spinneret may be discharged in the direction of a rotating roller that is submerged in the bottom of the coagulation bath and drawn upwards from the coagulation bath. In each case, the CNT aggregate structures are continuously drawn from the coagulation bath at a linear velocity equal to or greater than the linear discharge velocity. The linear velocity of the CNT aggregate structures is preferably 1 to 10 times the linear discharge velocity, more preferably 1.2 to 5 times, and further preferably 1.5 to 3 times. In the method of discharging the aqueous dispersion in the direction of gravity, a more uniform tension can be applied when forming the CNT aggregate structures, which is preferable from the point of view of a enabling a reduction in the thickness irregularity of the fiber containing CNTs and enabling a further increase in the roundness of the cross-section.

An organic solvent which is miscible with water is preferable as the organic solvent contained in the coagulation bath, and examples thereof include lower alcohols such as ethanol, methanol, propanol, and isopropanol, ketones such as acetone, methyl ethyl ketone, and 4-methyl-2-pentanone (MIBK), ethers such as tetrahydrofuran and dioxane, amides such as DMF, acetamide, formamide, dimethylacetamide, and N-methylpyrrolidone, glycols such as ethylene glycol, propylene glycol, diethylene glycol, dipropylene glycol, and glycerin, alkylene glycol monoalkyl ethers such as ethylene glycol monomethyl ether and ethylene glycol monoethyl ether, dimethyl sulfoxide, and acetonitrile. The solvent of the coagulation bath is preferably an aqueous organic solvent. Though the temperature of the coagulation bath is not particularly limited, the combination of the organic solvent and the temperature is selected so that the CNT aggregate structures are in a solidified state which can be continuously drawn from the coagulation bath at a linear velocity greater than or equal to the linear discharge velocity, and thus, a temperature range of 5 to 50° C. is preferable from the viewpoint of easy temperature control.

In another embodiment, water may be used as the solvent of the aqueous dispersion and the coagulation bath. In such a case, a salt can be added to the solvent of one or both of the aqueous dispersion and the coagulation bath. When a salt is included in the solvent of neither the aqueous dispersion nor the coagulation bath, there is a risk that it may be difficult to bring the CNT aggregate structures into a solidified state in which the CNT aggregate structures can be continuously drawn from the coagulation bath at a linear velocity greater than or equal to the linear discharge velocity. Though the salt may be either an inorganic salt or an organic salt, an inorganic salt is preferable. The salt is water soluble. The salt is preferably an alkali metal salt or alkaline earth metal salt, is more preferably a sodium salt, potassium salt, lithium salt, calcium salt, magnesium salt, barium salt, or strontium salt, and is further preferably a sodium salt, calcium salt, or magnesium salt. Examples of anions of salts include chloride ions, fluorine ions, bromine ions, iodine ions, sulfate ions, sulfite ions, phosphate ions, nitrate ions, nitrite ions, methanesulfonic acid ions, benzenesulfonic acid ions, toluenesulfonic acid ions, citrate ions, oxalate ions, malate ions, tartrate ions, maleate ions, fumarate ions, and acetate ions.

Examples of preferable salts include sodium chloride, potassium chloride, lithium chloride, calcium chloride, magnesium chloride, sodium bromide, potassium bromide, calcium bromide, magnesium bromide, sodium sulfate, potassium sulfate, sodium nitrate, potassium nitrate, calcium nitrate, magnesium nitrate, sodium phosphate, disodium monohydrogen phosphate, monosodium dihydrogen phosphate, sodium phosphate, disodium monohydrogen phosphate, monosodium dihydrogen phosphate, potassium phosphate, dipotassium monohydrogen phosphate, monopotassium dihydrogen phosphate, potassium phosphate, dipotassium monohydrogen phosphate, and monopotassium dihydrogen phosphate.

The salt concentration in the solvent of the aqueous dispersion and the coagulation bath is, in the aqueous dispersion, preferably 0 to 25% by mass, more preferably 0 to 20% by mass, and in the coagulation path, preferably 0 to 40% by mass, more preferably 0 to 35% by mass. A single salt or a combination of two or more types of salts may be dissolved in the aqueous dispersion and/or the coagulation bath. When a salt is contained in the coagulation bath or the aqueous dispersion, the salt is also contained in the solvent of the coagulation bath after the aqueous dispersion has been discharged. The concentration of the salt in the solvent of the coagulation bath after the aqueous dispersion has been discharged is preferably 0.5 to 40% by mass, and more preferably 1 to 35% by mass. Since the salt can be contained in only the aqueous dispersion or only the solvent of the coagulation liquid, the lower limit of the concentration of the salt in the solvent of the aqueous dispersion and the coagulation liquid is 0% by mass, and the lower limit of the concentration of the salt in the solvent of the aqueous dispersion containing the salt or the coagulation bath containing the sale is preferably about 0.5% by mass, more preferably about 1% by mass, and the upper limit is preferably about 40% by mass, more preferably about 35% by mass.

The time of immersion of the discharged CNT aqueous dispersion in the coagulation bath differs in accordance with the conditions of the coagulation bath and is not particularly limited as long as the CNT aggregate structures can be brought into a solidified state in which they can be continuously drawn from the coagulation bath at a linear velocity equal to or greater than the linear discharge velocity. The coagulation bath may be a static bath or may be a fluidized bath using a tube.

The fiber consisting of CNTs drawn from the coagulation bath is further immersed in water or an organic solvent similar to the solvent of the coagulation bath, and the surfactant and/or salt(s) is washed and removed. The temperature of water or the organic solvent in this washing step is not particularly limited, and may be, for example, about 5 to 50° C., preferably about room temperature. The immersion time is not particularly limited, and may be, for example, 2 hours or more, preferably 24 hours or more. As a result of this immersion step in water, a fiber composed of surfactant and/or CNTs from which an appropriate amount of salt(s) has been removed can be obtained.

In a wet state, the fiber consisting of CNTs is next subjected to an elongation step. Elongation is performed between rotary rollers, such as Nelson type feed rollers, and elongation is performed by making the speeds of the rollers different. The elongation ratio is preferably 5 to 70%, more preferably 10 to 50%. Due to such elongation, the CNT bundles in the fiber constituted from CNTs become aligned in the fiber axial direction, the cross-sectional area is reduced, and the CNT fiber density is increased. The elongation ratio is defined by the following formula:

elongation ratio (%)=[{(length after elongation)−(length before elongation)}/(length before elongation)]×100

After elongation, the fiber consisting of CNTs can be obtained by further washing with water or an organic solvent similar to the solvent in a coagulation bath, if necessary, and drying.

EXAMPLES

The present invention will be specifically described below using Examples and Comparative Examples. Note that the present invention is not limited to the following Examples.

The methods for measuring the physical properties of the CNT fiber were as follows.

[Thickness and Thickness Irregularity]

Figure 1:
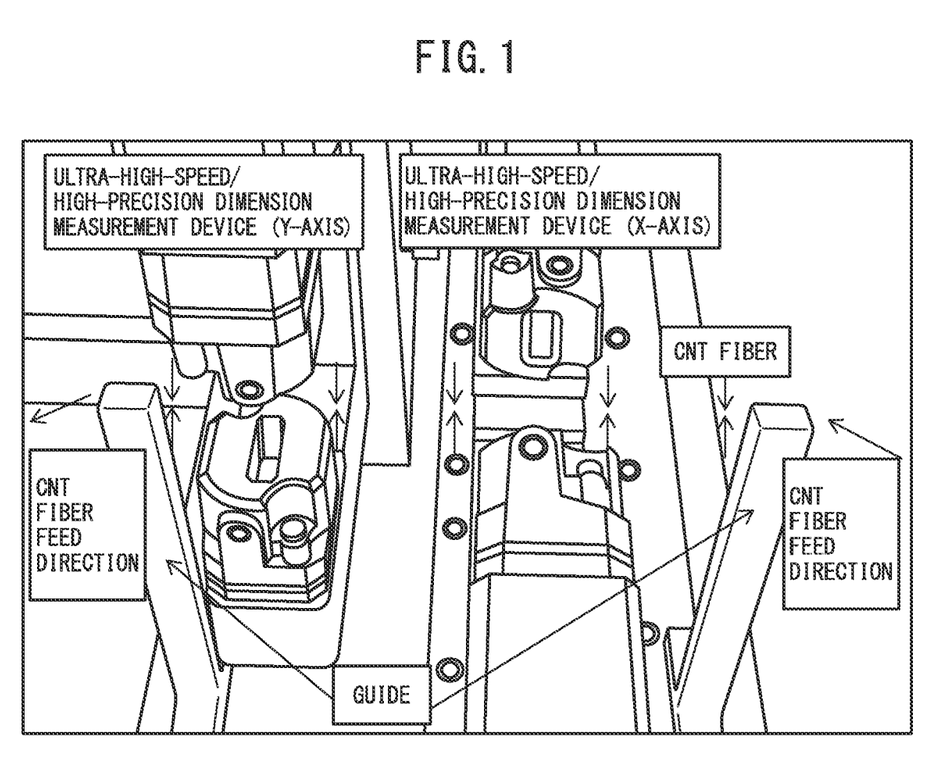
FIG. 1 is a photograph of the devices for measuring the shape of the CNT fiber.

Two ultra-high-speed and high-precision dimension measuring instruments (manufactured by Keyence Corporation, model number LS-9006) were arranged with respect to the cross-section of the CNT fiber as shown in FIG. 1, the thicknesses in the X-axis direction and the Y-axis direction were measured in a non-contact state on two axes of the X-axis and Y-axis cross-sections. Regarding the number of measurements, measurement was performed for each cm of the CNT fiber for a total of 565 points. The length of the CNT fiber was 5.65 m, and the average value in the X-axis and Y-axis directions at the 565 points was defined as the thicknesses.

Thickness irregularity was measured from the average value of all of the 1130 measured values of thicknesses in the X-axis and Y-axis, and after calculating the standard deviation, the value obtained by dividing the standard deviation of the thicknesses by the average value of the thicknesses was defined as the coefficient of variation for thickness irregularity.

[Roundness]

X/Y was determined for each of the 565 points in the X-axis direction and the Y-axis direction, and among all of the 565 points, roundness was determined from the distribution rate a (%) of $0.9 \leq X/Y \leq 1.1$ and the distribution rate b (%) of $0.8 \leq X/Y \leq 1.2$. Regarding roundness measurement, in each of the X-axis direction and the Y-axis direction, the time, speed, and distance between the CNT fibers passing through the ultra-high-speed and high-precision dimension measuring devices were measured, and statistical analysis was performed using the measured values to correct the plot points, whereby the numerical values of the X-axis and the Y-axis within the same cross-section of the CNT fiber were obtained, and X/Y was calculated.

[Presence Rate of CNT Having Diameter of 5 nm or Less]

The CNT fiber was shear-dispersed in N-methyl-2-pyrrolidone, and the dispersion was applied to a grid and dried.

The grid was photographed as shown in FIG. 2 with a transmission electron microscope (TECNAIG2F20 manufactured by FEI) at 200000 to 1,000,000 times magnification and at an accelerating voltage of 200 V, diameter was measured using image analysis software (WinROOF manufactured by Mitani Corporation), and the total number of CNT having a diameter of 5 nm or less among 100 fibers was measured.

[G/D Ratio in Resonance Raman Spectroscopic Measurement]

The G/D ratio was measured using a triple Raman spectrometer (T64000 manufactured by Horiba, Ltd.) at a wavelength of 532 nm.

[Fiber Density]

The weight of the CNT fiber per 5 m was measured using a precision balance (XPE205 manufactured by Mettler Toledo Corp.), and the cross-sectional area of the CNT fiber was calculated from the average value of the thickness using the ultra-high-speed and high-precision dimension measuring device described above. The volume of the CNT fiber was calculated by multiplying the cross-sectional area and the length of the CNT fiber, and the fiber density (g/cm$^3$) was calculated by dividing the weight of the CNT fiber by the volume.

[Conductivity]

Conductivity was determined using the four-terminal method by measuring the voltage value when a predetermined current was applied to the CNT fiber, and calculating the resistance value from the current-voltage gradient. Conductivity measurement of the CNT fiber was performed using a measurement jig having a fixed intra-terminal distance, an oscillator (AFG3022 manufactured by Tektronix), potentio-galvanostat (HAL3001 manufactured by Hokuto Denko), and an oscilloscope (DL850E manufactured by Yokogawa Measurement).

The conductivity was measured using the obtained current value, the value of the cross-sectional area of the CNT fiber obtained from the average values of the thicknesses determined using the ultra-high-speed and high-precision dimension measuring devices described above, and the values of the intra-terminal distances of the measurement jig.

[Coil Density]

4 m of the obtained CNT fiber was wound on a polyethylene bobbin having a width of 2 mm and a diameter of 3 mm while a traverse tension of 10 g was applied thereto so that the layers were stacked one by one. The wound CNT fiber was fixed so as not to be loosened, and the bobbin was hardened with epoxy resin. A 0.5 mm-thick section was cut out so as to obtain a cross section of the CNT fiber, and a photograph was taken at a magnification of 1000 times with a microscope (VHX-5000 manufactured by Keyence Corporation). The surface properties of the CNT fiber portions and the epoxy resin (void) portions were measured by image processing in the visual field, and the area ratio (%) of the CNT fiber was calculated, which was used as an index of the density of the coil.

Example 1

4 g of CNTs (EC1.4 manufactured by Meijo Nano Carbon; hereinafter referred to as eDIPS-CNTs) manufactured by enhanced direct injection pyrolytic synthesis (eDIPS) and 8 g of sodium taurodeoxycholate ("TDOC" manufactured by Sigma-Aldrich) were added to 1988 g of water, and the mixture was dispersed for 60 minutes using an ultra-high-speed multi-stirring system (Labolution manufactured by Primix Corporation). Thereafter, defoaming was performed for 10 minutes using a rotation and revolution type mixer (ARE-250 manufactured by Thinky Co., Ltd.), whereby an eDIPS-CNTs dispersion having an eDIPS-CNTs weight concentration of 0.2% by mass was obtained.

The water was evaporated by imparting heat to the obtained eDIPS-CNTs dispersion on a hot plate, such that the weight concentration of eDIPS-CNTs became 0.4% by mass.

This eDIPS-CNT dispersion was loaded into a syringe, an injection spinning nozzle having an inner diameter of 0.21 mm was attached thereto, and using a syringe pump (YSP-301 manufactured by YMC Corporation), the dispersion was coagulated into a fiber by being discharged direction into an ethanol solution in the direction of gravity under the condition of a discharge speed of 5.25 m/min, the rotational speed of the winding device was set to 6.45 m/min so that the coagulated fiber did not slack, and the coagulated fiber was drawn from the ethanol solution and wound. Next, the coagulated fiber was immersed in a water tank using a feed roller, drawn from the water using the winding device, and dried. In this step, the number of rotations of the feed roller and the winding device were changed to elongate the raw fiber by 10%, and the fiber was dried to obtain a CNT fiber.

The average diameter, distribution rate a, distribution rate b, coefficient of variation, which is a parameter of thickness irregularity, and roundness were measured, and the presence ratio of CNTs having a diameter of 5 nm or less, conductivity, and G/D ratio were calculated.

The obtained CNT fiber had an average diameter of 26 μm, a coefficient of variation of 0.111, a distribution rate a of 5%, a distribution rate b of 84%, a presence ratio of CNTs having a diameter of 5 nm or less of 94%, a G/D ratio of 30, a conductivity of 5800 S/cm, and a fiber density of 0.6 g/cm$^3$.

Example 2

A CNT fiber was obtained in the same manner as Example 1 except that an eDIPS-CNT dispersion in which the weight concentration of eDIPS-CNTs was adjusted to 0.6% by mass by further evaporating the water of the eDIPS-CNT dispersion of Example 1 was used. The obtained CNT fiber had an average diameter of 30 μm, a coefficient of variation of 0.10, a distribution rate a of 52%, a distribution rate b of 80%, a presence ratio of CNTs having a diameter of 5 nm or less of 95%, a G/D ratio of 28, a conductivity of 5600 S/cm, and a fiber density of 0.6 g/cm$^3$.

Example 3

A CNT fiber was obtained in the same manner as Example 1 except that in place of the injection spinning nozzle having an inner diameter of 0.21 mm, an injection spinning nozzle having an inner diameter of 0.41 mm was used. The obtained CNT fiber had an average diameter of 53 μm, a coefficient of variation of 0.15, a distribution rate a of 49%, a distribution rate b of 75%, a presence ratio of CNT having a diameter of 5 nm or less of 96%, a G/D ratio of 25, a conductivity of 4000 S/cm, and a fiber density of 0.5 g/cm$^3$. Furthermore, coil density evaluation was performed, and the coil density (area ratio of CNT fiber) was 85%, which was higher than that of Comparative Example 1.

Example 4

A CNT fiber was obtained in the same manner as Example 1 except that in place of eDIPS-CNTs, SG-CNTs were used.

The obtained CNT fiber had an average diameter of 23 μm, a coefficient of variation of 0.07, a distribution rate a of 55%, a distribution rate b of 82%, a presence ratio of CNTs having a diameter of 5 nm or less of 70%, a G/D ratio of 2.5, a conductivity of 450 S/cm, and a fiber density of 0.6 g/cm$^3$.

Example 5

A CNT fiber was obtained in the same manner as Example 1 except that the elongation rate was set to 20% by setting the rotational speed of the winding device to 11.00 m/min.

The obtained CNT fiber had an average diameter of 16 μm, a coefficient of variation of 0.07, a distribution rate a of 65%, a distribution rate b of 90%, a presence ratio of CNTs having a diameter of 5 nm or less of 95%, a G/D ratio of 30, a conductivity of 18000 S/cm, and a fiber density of 0.8 g/cm$^3$.

Comparative Example 1

0.4% by mass of an eDIPS-CNT dispersion identical to that of Example 1 was loaded into a syringe, an injection spinning nozzle having an inner diameter of 0.41 mm was attached thereto, and using a syringe pump (YSP-301 manufactured by YMC Corporation), the dispersion was directly discharged into an ethanol solution loaded into a petri dish at a discharge rate of 5.26 m/min. The petri dish was rotated so that the speed at which the fiber was drawn from the petri dish was 6.45 m/min, whereby a coagulated fiber that had solidified into a thread-like shape was obtained.

The obtained coagulated fiber was allowed to stand in ethanol for 1 day, and thereafter transferred to water and immersed for 3 days. 1 m of the coagulated fiber drawn from the water was fixed at both ends to a jig, was elongated by 10% by driving one end of the jig using a drawing device (manufactured by SDI Corporation), and dried to obtain a CNT fiber.

The average diameter, distribution rate a, distribution rate b, coefficient of variation, which is a parameter of thickness irregularity, and roundness were measured, and the presence ratio of SWCNTs and/or DWCNTs in the CNTs, the conductivity, and G/D ratio were measured in the same manner as Example 1 using 1.1 m length of six of the obtained CNT fibers. Furthermore, evaluation of the coil density was performed.

The obtained CNT fiber had an average diameter of 52 μm, a coefficient of variation of 0.28, a distribution rate a of 15%, a distribution rate b of 43%, a presence ratio of CNTs having a diameter of 5 nm or less of 98%, a G/D ratio of 30, a conductivity of 3400 S/cm, and a fiber density of 0.55 g/cm$^3$. The coil density (area ratio of CNT fiber) was 71%, which was lower than that of Example 3.

INDUSTRIAL APPLICABILITY

The fiber consisting of CNTs according to the present invention has a thickness of 0.01 μm to 3 mm, a coefficient of variation for thickness irregularity of 0.2 or less, and a distribution rate a of 40% or more and a distribution rate b of 70% or more as indicators of roundness. In other words, the fiber consisting of aligned CNTs is thin, has little thickness irregularity, has excellent roundness, has excellent coiling properties (winding properties) during coil processing, and has superior conductivity, and thus, can be suitable used in applications such as coils (motors and inductors) and electrical wires. Since the conductivity and current density depend on the smallest portion of the cross-sectional area of a single fiber, as long as the fiber has little thickness irregularity and a high cross-sectional roundness, and is uniform, the conductivity of a single fiber becomes relatively high. Furthermore, the coilability is excellent, and the coil can be wound densely, whereby conductive sites present in the coil become relatively frequent.

The invention claimed is:

1. A carbon nanotube (CNT) fiber consisting of CNTs and bile salts, having a thickness of 0.01 μm to 3 mm, a coefficient of variation for thickness irregularity of 0.2 or less, and a distribution rate a of 40% or more and a distribution rate b of 70% or more as indicators of roundness, wherein in a spectrum obtained by resonance Raman spectroscopic measurement, when the maximum peak intensity in the range of 1550 cm$^{-1}$ to 1650 cm$^{-1}$ is defined as G and the maximum peak intensity in the range from 1300 cm$^{-1}$ to 1400 cm$^{-1}$ is defined as D, the ratio G/D is 30 or more, and the CNT fiber has a fiber density of 0.8 g/cm$^3$ to 2.0 g/cm$^3$.

2. The CNT fiber according to claim 1, wherein 50 or more CNTs having a diameter of 5 nm or less are present in arbitrary 100 CNTs when observed with a transmission electron microscope.

3. The CNT fiber according to claim 1, having a conductivity of 3000 S/cm to 60000 S/cm.

4. The CNT fiber according to claim 1, wherein the bile salts are sodium cholate, sodium taurocholate, sodium deoxycholate and/or sodium taurodeoxycholate.

5. An electrical wire comprising the CNT fiber according to claim 1.

6. A coil comprising the CNT fiber according to claim 1.

* * * * *